United States Patent [19]

DeLauder et al.

[11] 4,097,613

[45] Jun. 27, 1978

[54] PROCESS FOR PREPARING A PROTEIN FORTIFIED NATURAL CEREAL

[75] Inventors: William R. DeLauder, Manchester, Mo.; Ferdinand E. Spring, Davenport, Iowa

[73] Assignee: Ralston Purina Company, St. Louis, Mo.

[21] Appl. No.: 753,118

[22] Filed: Dec. 22, 1976

Related U.S. Application Data

[63] Continuation-in-part of Ser. No. 599,794, Jul. 28, 1975, abandoned.

[51] Int. Cl.² .............................................. A23L 1/10
[52] U.S. Cl. ..................................... 426/303; 426/93
[58] Field of Search ................. 426/93, 309, 103, 656, 426/104, 307, 303

[56] References Cited

U.S. PATENT DOCUMENTS

| 3,662,672 | 5/1972 | Hoer | 426/656 |
| 3,689,279 | 9/1972 | Bedenk | 426/656 |
| 3,876,811 | 4/1975 | Bonner et al. | 426/309 |

*Primary Examiner*—Joseph M. Golian
*Attorney, Agent, or Firm*—Virgil B. Hill

[57] ABSTRACT

A protein fortified, natural cereal product is disclosed having a protein content above about 20% by weight which comprises a mixture of whole farinaceous grains, flavorants, and sweeteners with a textured vegetable protein material added for the purposes of protein supplementation without undesirable agglomeration of the grain particles and resistance to drying, both of which are normally associated with the addition of a vegetable protein flour to a natural cereal product.

6 Claims, No Drawings

PROCESS FOR PREPARING A PROTEIN FORTIFIED NATURAL CEREAL

BACKGROUND OF THE INVENTION

This application is a continuation in part of our co-pending application Ser. No. 599,794, filed July 28, 1975 and now abandoned.

This invention relates to a protein fortified natural cereal product and a method of making the same.

"Natural" cereal products have, in recent years, achieved a high degree of consumer acceptance. This type of cereal product generally employs whole grain particles as the basal ingredient. This is contrasted with extruded or formed cereal products, all of which are formed from a homogenous dough of various types of ingredients. The use of whole grain particles as the basal ingredient for the cereal provides a product having a high degree of consumer acceptance because of the varying texture and shape of the whole grain particles which are the principal ingredients of the product. The addition of various flavoring materials such as nuts and the like, together with sweeteners such as honey or sugar permits the coating of the individual whole grain particles, but without destroying the desirable texture of product since the physical character of the whole grain particle is substantially unaltered during processing. The sweetened, coated particles, then represent a highly desirable product consisting of individual, whole grain particles which are individually coated, thereby having a desirable flavor and texture with a high degee of consumer appeal.

It would be desirable if a higher level of protein could be provided with such a natural cereal product since most of the whole grains employed as basal ingredients are principally farinaceous materials which are relatively low in protein. Accordingly, the supplementation of the farinaceous grain particles with a high purity protein material will improve the nutritive qualities of the product, but must be able to do so without seriously eliminating either the desirable texture or flavor of the natural cereal product.

Many breakfast cereal products of the prior art have included a protein supplement to enhance its nutritive qualities. Most of these cereal products, however, are of the extruded, flaked, or shredded variety in which the whole grain particles are altered or formed into a homogenous dough and the desired texture or shape is provided by extrusion, rolling, shredding or similar forming techniques. Typically, the protein source which is employed to enhance the protein value of the cereal product is a dried, protein flour or isolate of a relatively bland flavor, having a protein content on the order of 50-95% by weight, and is normally derived from vegetable protein sources such as defatted soybean flakes. In the case of isolate, alkali extraction of the defatted flakes, acid precipitation, and subsequent drying of the precipitated protein is carried out. In high protein cereals of the prior art, the isolate or vegetable protein flour has been included either as a part of the homogenous dough, from which the shaped particles are formed, or alternatively it has been dusted on the shaped product in the form of a powder.

With a natural cereal product, however, where the whole or large grain particles are employed as the basal ingredient, the option of including the protein isolate or flour by mixing into a homogenous dough does not exist. Therefore, the only suitable alternative is to dust the protein flour on the grain particles during the process. A dried protein isolate or flour of any type, especially that derived from vegetable protein materials such as soybeans, has a tendency to both resist wetting as well as after being wet, to also resist the removal of moisture. As a consequence, this inherent property of a powdered isolate or flour causes some difficulties in the production of a natural cereal product, especially in retaining the particle identity of the whole grain particle which is the primary factor in the texture and aesthetic appeal of the product.

These difficulties associated with the use of a soy flour in natural cereal products can be traced to the retention of moisture by the soy flour thereby causing undesirable agglomeration of the whole grain particles and creating large "dough-like" chunks of a product with a hard, brittle texture without retaining identifiable pieces of the individual grains that provide the main appeal for a natural cereal product. Furthermore, a need exists for more severe drying conditions in order to remove moisture from the product, which is added as a medium or carrier for the coating of the whole grain particles with a sugar or similar material. Not only would more severe drying conditions disrupt the character of the product by burning, but would add to the cost of manufacture. As a consequence, protein supplementation of a natural cereal product has presented some problems to the art, since protein supplementation with high purity protein material was not possible with a protein flour in view of such undesirable effects on the texture of the product.

SUMMARY OF THE INVENTION

The present invention concerns a natural cereal product of a high protein content, which is nutritionally supplemented with a vegetable protein material but without having a deleterious effect on texture of the product and absent any difficulty in manufacturing the same.

The natural cereal product of the present invention comprises a mixture of whole, farinaceous grains such as wheat, oats, rice, rolled oats, barley and flaked wheat, together with flavorings, sweeteners, and oil having a protein content greater than about 20% by weight, which includes as a protein supplement a texturized vegetable protein material. The use of a texturized vegetable protein material in a natural cereal product provides the requisite degree of protein supplementation without the disadvantages associated with a protein isolate or flour, such as agglomeration of the particles and resistance to drying. Furthermore, an unexpected advantage of the natural cereal product of the present invention is the improved degree of flavor obtained especially when a texturized expanded vegetable protein material is used which is, at least in part, derived from peanuts or mixtures of peanuts and other vegetable protein materials. The "nutty" taste of peanuts is generally more recognized and acceptable to humans than is the more "beany" flavor of soybeans. As a consequence, the textured protein material derived from peanuts actually enhances and improves the flavor of a natural cereal product even though such a product made with texturized soybean materials is also highly acceptable.

The process of making the natural cereal product of the present invention is further characterized by the general steps of forming a mixture of whole farinaceous grains such as oats, wheat, rice, and the like, together with a texturized vegetable protein material in proportions such that a protein content of greater than 20% by weight in the final coated product is achieved. Thereafter a sweetening solution containing a percentage of sugar sufficient to provide a level of 15 – 25% by weight in the final product is mixed with the dry mixture at a ratio of about 1:4 by weight to thoroughly coat the product, followed by the addition of oil and drying of the product. The temperature and time at which the product is dried is not critical to the practice of the present invention, as well as the exact final moisture content although typically, the mixture is dried at a temperature and for a period of time sufficient to provide a moisture content below about 5% by weight in the final product. Preferred temperatures for drying are above about 220° F., preferably 230° – 260° F. for about 5 to 15 minutes.

The resultant product comprises coated whole grain particles, which includes a texturized vegetable protein, which has a nutritive protein value without sacrifice of the desirable texture and flavor associated with the use of whole grain particles.

It is, therefore, an object of the present invention to provide a natural cereal product of a high protein content having improved flavor and texture.

It is also an object to provide a process for making such a product which does not employ operative conditions that would either disrupt the texture of the whole grain particles or the desirable flavor generally associated with the product.

A further object is the provision of a natural cereal product which is enhanced in flavor as well as nutritive properties by the addition of a vegetable protein material.

These and other objects of the present invention will be more fully realized when considered together with the following detailed description of the invention in terms of both preferred and specific embodiments.

DESCRIPTION OF THE PREFERRED EMBODIMENTS

The high protein cereal product of the present invention is formed by first providing a mixture of whole farinaceous grain particles either cooked, partially cooked, or uncooked, together with a textured vegetable protein material, in proportions such that the final product will have a protein content on the order of 20% or higher. The farinaceous grains which are suitable for use as the basal ingredients of the present invention are not critical to its practice and any natural grain particle which would be considered palatable and acceptable to humans may be employed. It is also not critical to the practice of the present invention whether these ingredients be cooked or uncooked or otherwise processed in some manner prior to being employed in the present invention. For example, typical ingredients include oats, wheat, barley, bran and corn as well as processed grains such as rolled or flaked oats and wheat. In any event, any of these grains are used in the cereal product of the instant invention without further physical alteration, thereby providing an essentially "natural" cereal product. It is not critical, however, to the practice of the instant invention as to the specific type of farinaceous grain materials that can be employed.

The farinaceous grains are mixed with a textured vegetable protein material, in proportions such that the final cereal product will have a protein content above about 20% by weight. Typically, the relative percentages of farinaceous grains and textured vegetable protein based on the total product to provide this level of protein will be on the order of 35 – 45% by weight of the farinaceous grain materials and 15 – 25% by weight of textured vegetable protein.

Textured vegetable protein is meant to refer to a variety of products which meet the accepted definition for this type of material and which are produced by a variety of texturizing processes. For example, spun protein fiber is an example of one of the earliest forms of textured vegetable protein, as disclosed in U.S. Pat. No. 2,682,466. More recently, extruded vegetable protein products which have a fibrous expanded structure have been made commercially available and typical processes for the production of this type of product by extrusion are set forth in U.S. Pat. No. 3,496,858 and British Pat. No. 1,105,904. Other types of processes which yield textured protein products include those described in U.S. Pat. Nos. 3,662,671; 3,662,672; 3,662,673 and 3,759,715.

All of these various types of textured protein materials are produced from a vegetable protein starting material such as soybeans, cottonseed, peanuts, safflower, sunflower, sesame or similar materials. Typically, the starting material used in producing the textured product will have a protein content above about 30% by weight, and can vary between 30– 100%, thereby including vegetable protein isolates and flours, as well as concentrates. Insofar as the instant invention, the particular type of textured vegetable protein material, whether it be extruded, spun or whatever is not critical to its practice. Furthermore, the particular type or purity of protein material from which it is derived is not critical nor is the exact purity of the textured product, although as noted, an objective of the present invention is for the final product to have a protein content by weight of greater than about 20%. Therefore, textured forms of vegetable protein which are derived from oilseeds such as soybeans and peanuts are typically the most commercially suitable and hence are suitable for use in the instant invention. As a specific and preferred embodiment of the present invention, however, it is desirable to use textured vegetable protein which is derived at least in part from peanuts. It has been determined that an unexpected improvement in taste and appeal is attained when textured protein derived from peanuts is used. The "peanut" flavor of the textured vegetable protein compliments and improves the flavor of the farinaceous grains employed. It is believed this improved flavor results from consumer familiarity with the peanut flavor as opposed to the relatively "beany" flavor of soybeans. The peanut meal can be used as the sole ingredient for the formation of the textured vegetable protein or mixed with another oilseed material such as soybeans and then converted to a textured product. As such, the peanut flavor adds to the appeal of the product to a greater degree than does the use of textured vegetable protein derived from soybeans.

After formulation of the mixture of farinaceous grains and the textured vegetable protein, various other dry ingredients are also added for the purpose of improving the flavor and appeal of the product. Among the flavorants used are typical materials such as nuts, raisins, milk solids, fruit or various other materials. The exact type of flavor to be obtained will, of course, be within the judgment of one skilled in the art.

To the dried mixture containing the farinaceous grains, textured vegetable protein, and flavorants, suitable sweeteners are preferably added in solution or in dry form to provide the product with a sweet taste. These are preferably added in the form of a solution so that the dry particles can be uniformly coated with the sweeteners. The exact type of sweetening agent used is, of course, not at all critical to the practice of the present invention and any type of sugar is suitable with preferred materials including natural sugars such as honey and brown sugar. The concentration of the sugar solution is not especially critical to the practice of the present invention, however, typical concentrations of sugar in the aqueous solution are that which are sufficient to provide a level of sugar in the final product of between about 15 and 25% by weight. One part of the sugar solution or sweetening solution is then mixed with about four parts of the dried product to provide the requisite degree of sweetness. The exact percentages of sweetener employed will, of course, be dependent on the flavor desired and the present invention is not intended to be limited in this respect. The sweetening solution can, of course, be sprayed on or simply added to the grain and protein mixture and the particular means of addition is not intended to limit the present invention. Either prior to or following the addition of the sweetening or flavoring solution of sugar, etc., a quantity of an edible oil is mixed with or sprayed on the product, simply to provide a uniform coating. The particular type of edible oil or fat is not at all limiting with this being determined by the particular flavor derived on the cereal product. Typical oils include coconut oil, or various vegetable oils, any of which are edible and suitable for food use.

The coated mixture of grain particles and textured vegetable protein then has a moisture content of about 15% by weight and needs to be dried to a moisture level of about 5% or less. As previously noted, the use of untextured vegetable protein material such as soy flour and the like tended to absorb the added moisture used in coating of the product and as such resist removal of the water during drying. This caused agglomeration of the grain and the formation of large, brittle chunks of cereal, which were rounded and smooth in texture without the desirable effect of having recognizable pieces of grain. Furthermore, more stringent drying conditions are required to remove moisture, thereby contributing to the cost of the product as well as possible burning or charring of the same.

The use of textured vegetable protein material which will absorb the added flavorants, and sweeteners, but without retention of the water during drying overcomes these difficulties, in addition to avoiding the previously mentioned problems with agglomeration or binding of the individual grain particles into large "dough-like" pieces because of excessive moisture retention by the vegetable protein flour.

The dried product is a ready-to-eat, sweetened "natural" cereal product with a protein content above about 20% by weight having an exceptionally desirable flavor and texture. The resultant product and process for making the same will be more fully apparent when considered together with the following specific embodiments.

EXAMPLE 1

A basal mixture of whole farinaceous grain was selected, formulated and mixed in the following weight percentages based on the final product's composition;

|  | Weight percentage |
| --- | --- |
| Rolled Oats | 27.7% |
| Flaked Wheat | 9.8% |

These were mixed in a dry state together with flavorants such as the following:

|  | Weight Percentage |
| --- | --- |
| Nonfat Milk Solids | 5.0% |
| Coconut Shreds | 4.2% |
| Diced Almonds | 5.0% |

To the dry mixture was added 27.7% by weight of the final product, extruded peanut fibers produced essentially as described in British Pat. No. 1,105,904 and these were thoroughly mixed together with the other dry ingredients. The dry mixture was then coated with a sweetening agent which comprised a mixture of honey and brown sugar in the following percentages:

|  | Weight Percentage |
| --- | --- |
| Honey | 1.7% |
| Brown Sugar | 16.7% | which was combined with one part by weight of water and four parts by weight of the dry ingredient mixture, and thoroughly mixed until the sugar was dissolved and coated the dry ingredients reasonably well.

Following this, the syrup coated particles were mixed with about 8% of vegetable oil for 1 to 2 minutes until the particles were completely coated. The coated product was then dried in a forced air oven with radiant heat at 250° F. for 10 minutes. The resultant product had a desirable sweet, nutty taste with a crisp, desirable texture and had a protein content of about 25% by weight.

EXAMPLE 2

Two separate basal mixtures of whole farinaceous grains were selected, formulated and mixed in the following weight percentages based on the final product:

|  | Weight Percentage |
| --- | --- |
| Rolled Blanched Oats | 28.7% |
| Flaked White Wheat | 9.8% |

Each of the separate mixtures of farinaceous materials were mixed in a dry state together with the following in the amounts indicated by weight of the final product:

|  | Weight Percentage |
| --- | --- |
| Nonfat Dry Milk | 5.0% |
| Diced Almonds | 5.0% |

To one of the basal mixtures containing the above 10.8% by weight of the final product of a powdered soy isolate and 10.8% of a peanut flour (57% protein) were added to the dry ingredients and thoroughly mixed.

To the second of the above basal mixtures 21.7% by weight of the final product of a textured vegetable protein material derived from a 50/50 weight mixture of soy isolate and peanut flour and produced as described in British Pat. No. 1,105,904 was added to the dry ingredients and mixed.

Both of the above dried mixtures were then coated with a sweetening and flavoring agent which comprised the following ingredients listed as a percentage of the final product.

|  | Weight Percentage |
| --- | --- |
| Brown Sugar | 20.8% |
| Vanilla | 0.7% |

Each of these products were combined with one part by weight of water and four parts by weight of each dry ingredient mixture and thoroughly mixed until the sugar was dissolved and coated all of the dry ingredients reasonably well. After this, each of the mixtures were coated with 8.3% of vegetable oil, and each were dried in an oven at 250°-260° F. for 12-14 minutes, followed by cooling with ambient air for 6 minutes.

The two dried products had a protein content of 25% and a moisture content of 5% by weight. An examination of the cereal product prepared with the powdered mixture of soy isolate and peanut flour indicated that the flour had caused the individual grain particles to agglomerate and to bind the individual grainlike particles into large, rounded "dough-like" pieces. The individual grain particles from the oats or wheat as well as the added nuts were no longer identifiable.

By contrast the cereal product containing the textured vegetable protein pieces exhibited excellent drying characteristics and had a desirable appearance in which the individual components such as the oats, wheat or nuts were still identifiable. This product further had a crunchy, desirable flavor.

The above Example is merely illustrative of the instant invention and it will be understood that various other changes in the details, ingredients or steps which have been described may be made without departing from the spirit of the instant disclosure, and such changes and other modifications are intended to be included within the scope of the instant disclosure and appended claims.

We claim:

1. A process for the production of a particulate protein fortified, natural cereal product having a protein content of at least about 20% by weight comprising;
   (a) forming a mixture of different, whole farinaceous grains, and a fortifying amount of a textured vegetable protein material having a protein content of above 30% by weight, said amount being sufficient to provide greater than a 20% protein content in the final product;
   (b) coating said mixture with an oil prior to or following a coating with sweetening solution and
   (c) drying said mixture at a temperature and period of time sufficient to provide a moisture content below about 5% by weight thereby providing a protein fortified natural cereal product.

2. A process as set forth in claim 1 wherein said mixture is dried at a temperature of at least about 220° F.

3. A process as set forth in claim 1 wherein said mixture is dried at a temperature of about 250° F. for 10 minutes.

4. A process as set forth in claim 1 wherein the textured vegetable protein material is derived at least in part from peanuts.

5. A process as set forth in claim 1 wherein the textured vegetable protein material is present in an amount of between about 15 - 25% by weight of the final product.

6. A process as set forth in claim 1 wherein the farinaceous grains are selected from the group consisting of whole wheat, whole oats, rolled oats and flaked wheat.

* * * * *